Patented Apr. 9, 1935

1,996,902

UNITED STATES PATENT OFFICE 1,996,902

CURRENT CONTROL SYSTEM FOR ELECTRIC WELDERS

James V. Caputo, Girard, Ohio

Application December 14, 1931, Serial No. 580,885

59 Claims. (Cl. 219—4)

My invention relates to the art of electric welding and, in particular, to a system for automatically controlling the supply of current to an electric welder. Several types of welding machines operating on the electrical resistance principle are now well known. Among these is the machine embodying an electrode and transformers mounted adjacent thereto for rotation as a unit. It is to such machine that the present invention is particularly adaptable, although it can also be applied readily to welding apparatus of other types.

It has been known previously that the temperature attained by the edges of a piece of skelp formed into cylindrical shape, upon the passage thereacross of an electric current, depends upon the magnitude of the current. The welding current, furthermore, is dependent upon the voltage giving rise to the current and the impedance of the circuit, which is constituted principally by the resistance of the seam between adjacent edges. The resistance across the seam of a formed tube depends upon the pressure exerted between said edges. It has heretofore been the practice to control the welding current manually by varying the voltage applied to the welding circuit, and also by varying the pressure between the seam edges, to change the resistance of the circuit. The pressure of the welding electrode on the tube also determines the resistance of the welding circuit and it has been the practice to raise or lower the electrode to provide the desired contact pressure on the tube. It is obvious that almost superhuman skill is required to manually adjust the welding voltage and the pressure on the seam edges so as to produce a satisfactory weld at all times. A further variable is the speed of travel of the tube being welded. Obviously, the greater the speed of travel for a given current, the smaller the amount of current traversing a unit section of the seam edge and the lower the temperature attained thereby. When an operator is called upon to control the speed of pipe travel as well as the other variables, the task amounts to a practical impossibility. It is an object of this invention to provide a system of control for an electric welder such that all the variables will be automatically controlled continuously in accordance with certain predetermined conditions. Only by such means can all the variables be properly controlled so as to produce the desired quality of product.

In accordance with my invention, I employ welding transformers which rotate with the electrode. High voltage current is supplied to the primary windings of the welding transformers from two generators in series. I arrange to vary the voltage generated by one or both of said generators so that the resultant voltage applied to the primary windings of the transformers may be varied at will or automatically with the desired effect on the secondary or welding voltage. Automatic voltage regulating means similar to that described and claimed in my copending application, Serial No. 574,507, filed November 12, 1931, for Control system for electric welder, since matured into Patent No. 1,967,198, dated July 17, 1934, is employed to maintain the desired constant welding voltage. The application of the high voltage to the transformer windings is controlled in accordance with the movement of pipe through the welder. I also provide means responsive to the speed of the welder for controlling the application of voltage in case the welder operates at speeds higher or lower than the optimum speed for a predetermined period of time. The welding current and the electrode speed are properly coordinated by automatic means to insure that each unit section of tube seam is traversed by the amount of current required to raise it to the welding temperature. Additional features such as voltage regulation and protection against various classes of contingencies, such as power failure and the like, are provided.

In order to control the current across the tube seam, I provide a means for varying the pressure of the electrode on the tube, as well as the pressure between the edges of the latter. These means are controlled jointly by the speed of the pipe and the magnitude of the welding current, so that the resistance of the welding circuit is always adjusted to the existing welding current and electrode speed. Means for discontinuing the welding current when the pipe leaves the welder are also included.

As an alternative method of controlling the voltage across the welding electrode, I have invented means for varying the phase angle between the two generators connected in series to supply the welding current to the electrode. I accomplish this by shifting the stators of the two generators in opposite directions, so that the resultant voltage is increased or decreased. The same principle is employed in cutting off the welding current just before the tube passes out of the welder.

For a full and complete understanding of the invention, reference is made to the accompanying drawings illustrating a present preferred embodiment. In the drawings:—

Referring in detail to the drawings, the system of my invention is adapted to supply energy to a welder 10 comprising an electrode 11 and transformer groups 12 located on either side on a shaft 13 which supports the electrode and transformers for rotation. Bearings 14 for the shaft are adjustable vertically by adjusting screws 15 for shifting the rotating apparatus. The shaft 13 is driven by a motor 16 through a gear 17 and a pinion 18. Adjustable side pressure rolls 19 are mounted below the electrode and a bottom roll 20 is positioned therebetween for receiving a formed tube 21 and guiding it through the welding throat constituted thereby, together with the electrode 11. This type of welder is described and claimed in my copending application, Serial No. 475,174.

Current is supplied to the primary windings of the transformers of groups 12 through a circuit 22, including a stabilizing reactor 23. The circuit 22 terminates at slip rings 24 to which the transformers of the groups 12 are connected in series or in parallel. Generators 25 and 26 are connected in series to the circuit 22 for supplying the current thereto. Preferably, the generator 26 is a constant voltage generator, having a Tirrill regulator, for example, and the generator 25 is a variable voltage generator, although both generators may have means for varying the voltage, if desired. The voltage of the generator 25 may be varied in magnitude or in phase relative to that of the generator 26 so that the voltage of the two machines is cumulative or in opposition. In other words, the generator 25 may be made to buck or boost the generator 26 so that practically any desired voltage may be applied to the welding transformers. I prefer to have the generators connected whether for bucking or boosting so as to employ a "stiff" field excitation with consequent reduction in the effect of armature reaction.

The generators 25 and 26 are mounted on a shaft 27 which is directly connected to a synchronous motor 28. The motor 28 draws its energy from a main supply circuit 29. In addition to the generators 25 and 26, and the motor 28, the shaft 27 also drives an exciter generator 30 adapted to generate a constant voltage, and an exciter generator 31 for generating a variable voltage. A constant voltage alternating current generator 32 is also mounted on the shaft for a purpose which will be explained later. The generator 30, of course, is adapted to supply direct current to the field windings of the generator 26 and the motor 28, as well as to operate electromagnetic relays and switches, which are to be mentioned hereinafter. The variable voltage exciter generator 31 supplies excitation for the variable voltage main generator 25.

In order to effect the proper coordination between the welding current and the electrode speed, which is usually the independent variable, I employ alternating current generators and provide means for driving said generators at speeds proportional to the welding current and the electrode speed, respectively. Generators 33 and 34 have distributed stator and rotor windings. The excitation for the stator windings is obtained from the circuit 29 through conductors 35. As is well known, generators of the type mentioned deliver energy from the rotor when operated above synchronous speed. Below synchronous speed the rotors absorb energy if any is available. In other words, the output from or input to the generator depends upon whether the generator is operating above or below synchronous speed and if so, to what extent. This is the ordinary induction generator principle in which the excitation is furnished by an alternating current.

The generator 33 is driven by a motor 36 which is of the watt hour meter type having a voltage winding 36' and a current winding 37. As in the case of the ordinary watt hour meter, the speed of the motor 36 is proportional to the product of the voltage applied to the voltage winding and the current traversing the current winding. The voltage winding 36' is energized by the constant voltage generator 32 and the speed of the motor 36, therefore, is proportional to the energization of the current winding 37. The latter is connected to a current transformer 38 in the circuit 22. The motor 36, therefore, operates at a speed proportional to the current traversing the primary windings of the transformers. Substantially a constant relation exists, of course, between the current in the primary and secondary windings of the transformers. The generator 34 is driven by the motor 16 through any convenient drive, as an example of which I have shown an adjustable belt 39 traveling on cone pulleys to permit variation in the relative speeds of the motor 16 and the generator 34. A commercial form of this device is known as the Reeves drive.

The speeds of the generators 33 and 34 are compared by an electrical differential relay 40, which is nothing more than an induction motor with a wound rotor. The relay should be designed, however, to operate at stand-still, since the rotor has only a limited movement for the purpose of making or breaking contacts. The stator winding of the relay 40 is connected to the slip rings of the generator 33. The rotor winding of the relay 40 is connected to the slip rings of the generator 34. The torque on the rotor of the relay 40, of course, depends upon the direction of the flow of power therethrough. If the generator 33 tends to send power through the relay 40 which is, of course, a transformer, to the generator 34 acting as a motor, the relay operates in one direction. If the flow of power is in the reverse direction, the torque on the rotor of the relay is similarly reversed. The relay 40 is provided with a contact arm 41 which carries moving contacts 42, 43 and 44.

The output of the generators 33 and 34 is also utilized to control the vertical adjustment of the electrode 11 and the pressure exerted by the side pressure rolls 19. Vertical adjustment of the electrode 11 is effected by the shaft 45 provided with worms 46 engaging worm wheels 47. The worm wheels 47 have threaded bores for receiving the adjusting screws 15 for shifting the shaft 13. The shaft 45 may be driven either by a motor 48 or by a motor 49. These motors are connected with the shaft 45, respectively, by electromagnetic clutches 50 and 51, electromagnets of said clutches being indicated diagrammatically at 52 and 53. The clutch magnets 52 and 53 are under the control of a relay 54, which is controlled in turn by a manual switch 55.

The motor 48 has stator and rotor windings 56 and 57 connected to the generators 33 and 34, respectively. The motor 48, therefore, operates similarly to the relay 40, the direction and magnitude of the torque of the motor being dependent upon the difference in frequencies of the generators. The motor 49 is manually controlled by a rheostat 58 connected in series with its field winding 59. The armature 60 and the field winding are connected to a separate source of direct current.

The constant voltage generator 30 supplies control current to various auxiliary devices through a control bus 61. The clutch magnet 52 is normally energized from this circuit since its lower terminal is connected directly to the bus 61 and its upper terminal is connected to the bus 62 through the lower, normally closed, or back contact of the relay 54. The motor 48 thus operates to raise or lower the electrode 11 to control the contact pressure on the tube being welded in accordance with the comparative speeds of the generators 33 and 34. The motor 49 permits the electrode 11 to be initially adjusted under manual control. In order for the motor 49 to adjust the electrode, however, the manual switch 55 must be closed to energize the relay 54 so that its upper, normally open, or front contact will be closed to energize the clutch magnet 53 and deenergize the magnet 52.

A Tirrill regulator 61a provides automatic regulation for the field winding of the variable voltage exciter generator 31 and consequently for the voltage of generator 25. The field winding is indicated at 62' and is normally connected in series with a resistor 63 across the armature of the generator 31. Conductors 64 comprise a circuit extending from the terminals of the resistor 63 to main contacts 65 of the regulator 61a. When the main contacts 65 are closed, the resistor 63 is shunted, with a resultant increase in the excitation of the generator 31 and a corresponding increase in the voltage generated thereby. The regulator includes a spring 66 tending to close the contacts, a magnetizing coil 67 tending to maintain the contacts open, and a differential coil 68 for neutralizing the effect of the magnetizing coil 67.

In addition to regulating the pressure of the electrode on the tube, and the voltage of the welding circuit, I also control the pressure of the side rolls 19 engaging the tube by automatic means. These rolls are mounted in adjustable housings 69 carried on adjusting screws 70. The screws 70 traverse a threaded bore in a sleeve 71 carried in supporting brackets 72. A gear 73 keyed to the sleeve 71 which is rotatable in the bracket 72 permits adjustment of the pressure of the side rolls by means of a motor 74 driving a shaft 75 provided with pinions 76 meshing with the gears 73. The motor 74 is similar to the motor 48 and its stator and rotor windings 77 and 78 are connected by circuits 79 and 80 to the generators 33 and 34. The side pressure rolls are thus adjusted to increase the pressure they exert on the tube when the speed of pipe travel, as indicated by the frequency of the generator 33 increases. The motors 48 and 74, of course, instead of being connected directly to the generators 33 and 34, may be controlled by relays similar to relay 40. A manually controlled motor similar to that shown at 49 may also be provided for adjusting the side pressure rolls.

Figure 1:
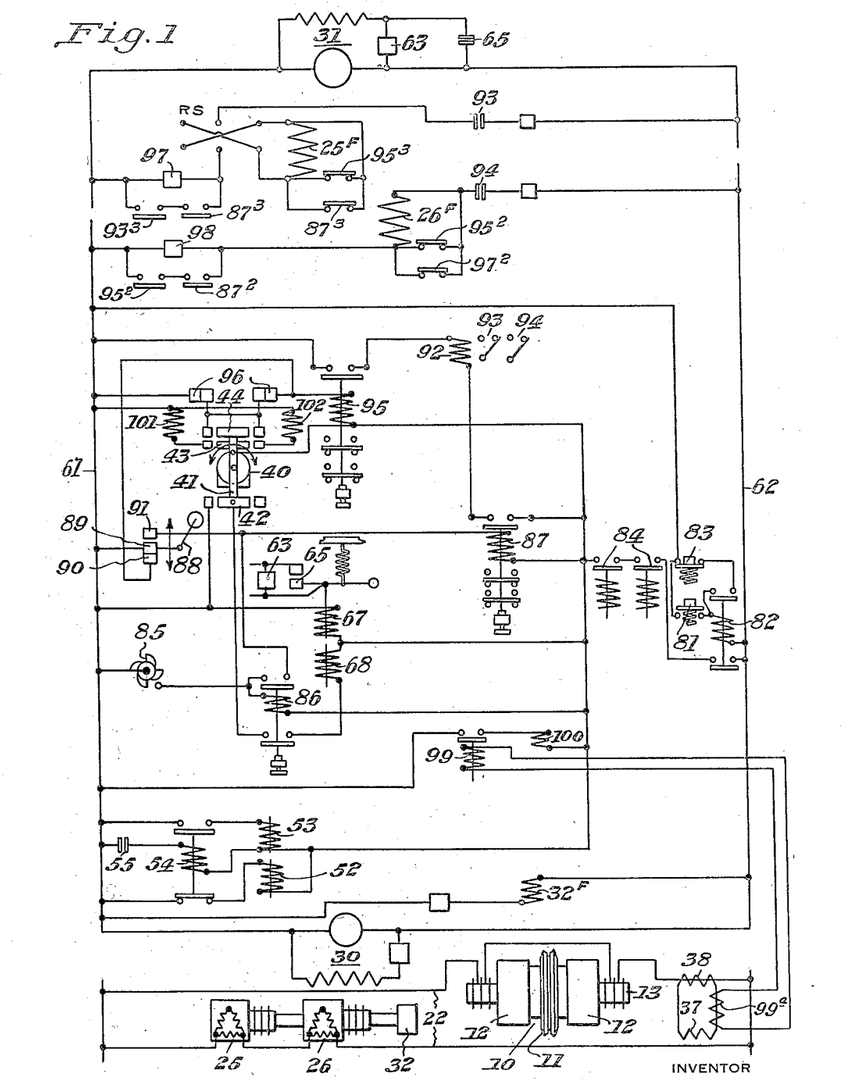
Figure 1 is a schematic circuit diagram illustrating the various elements of the system in such position that the circuits are simplified to the greatest possible extent.
Figure 2:
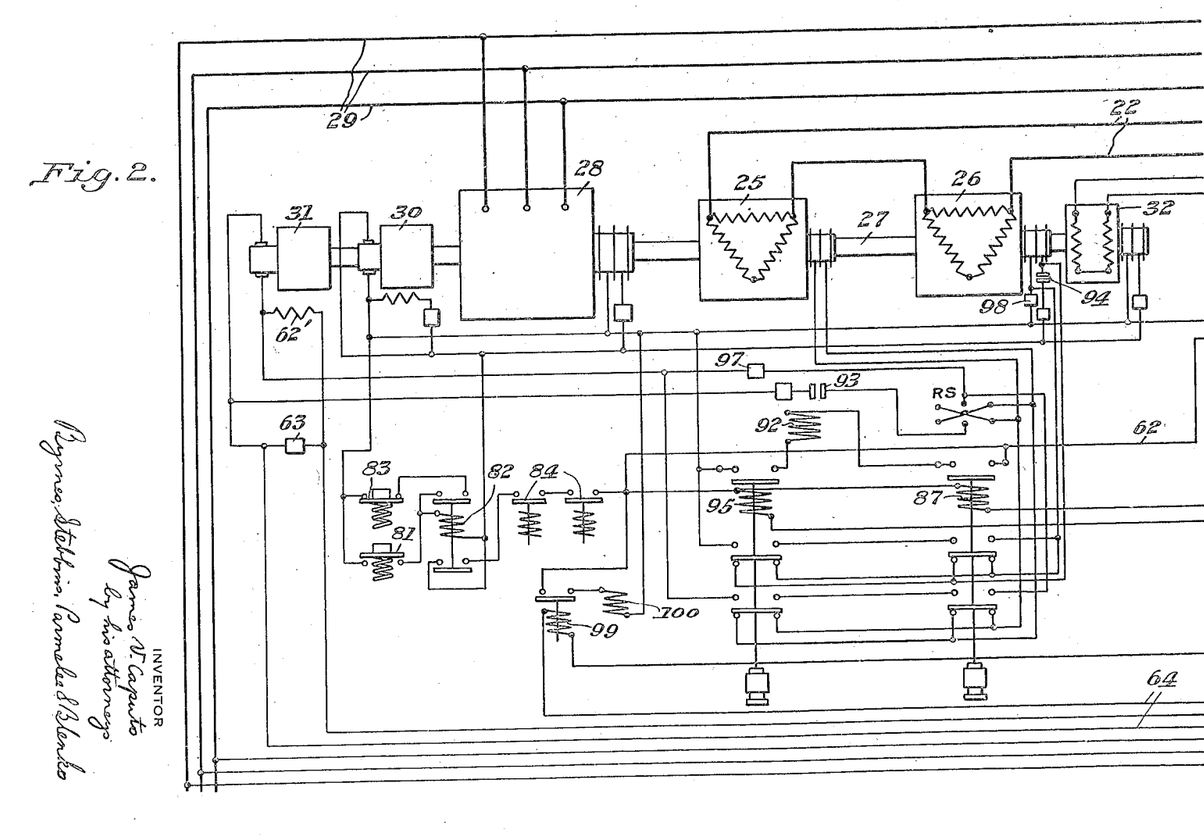
Figure 2 is a portion of a complete circuit diagram showing the various elements diagrammatically in the relative positions which they actually occupy.
Figure 3:
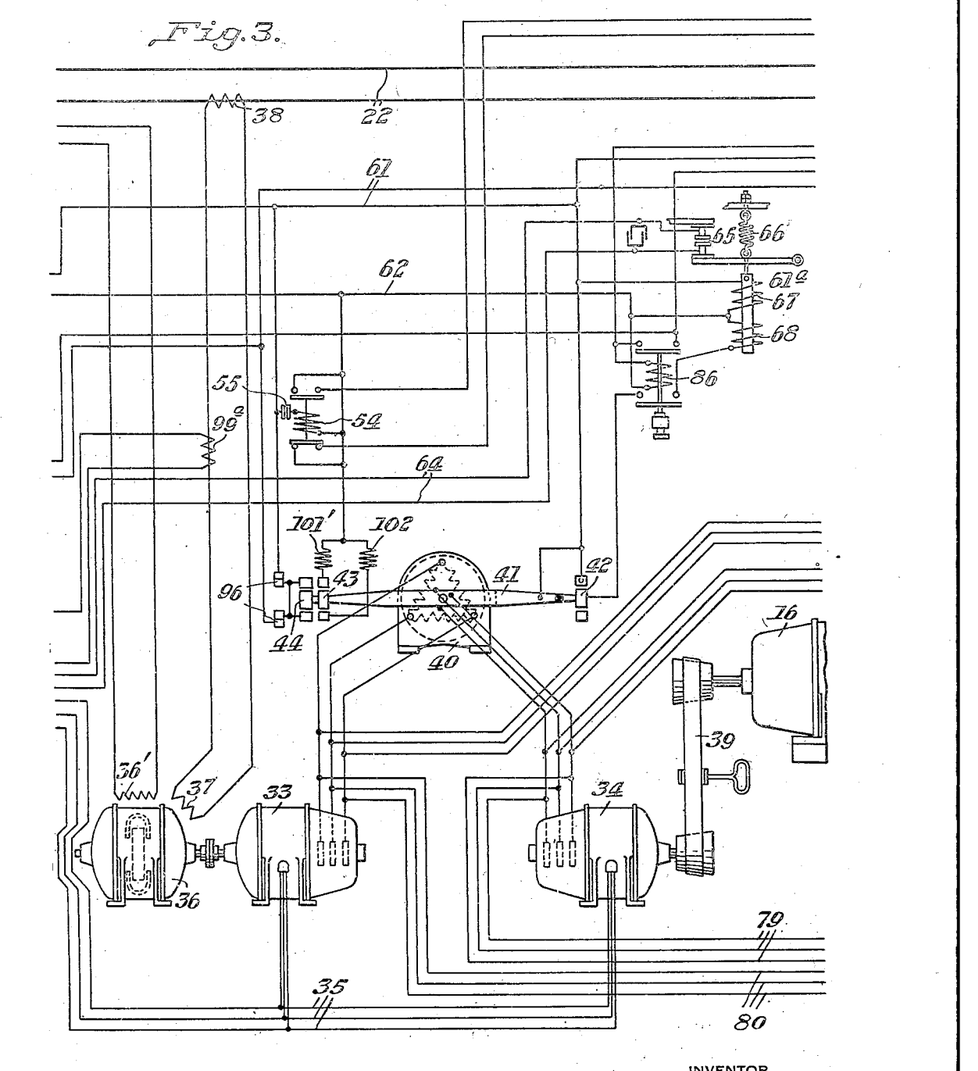
Figure 3 is another portion of the complete circuit.
Figure 4:
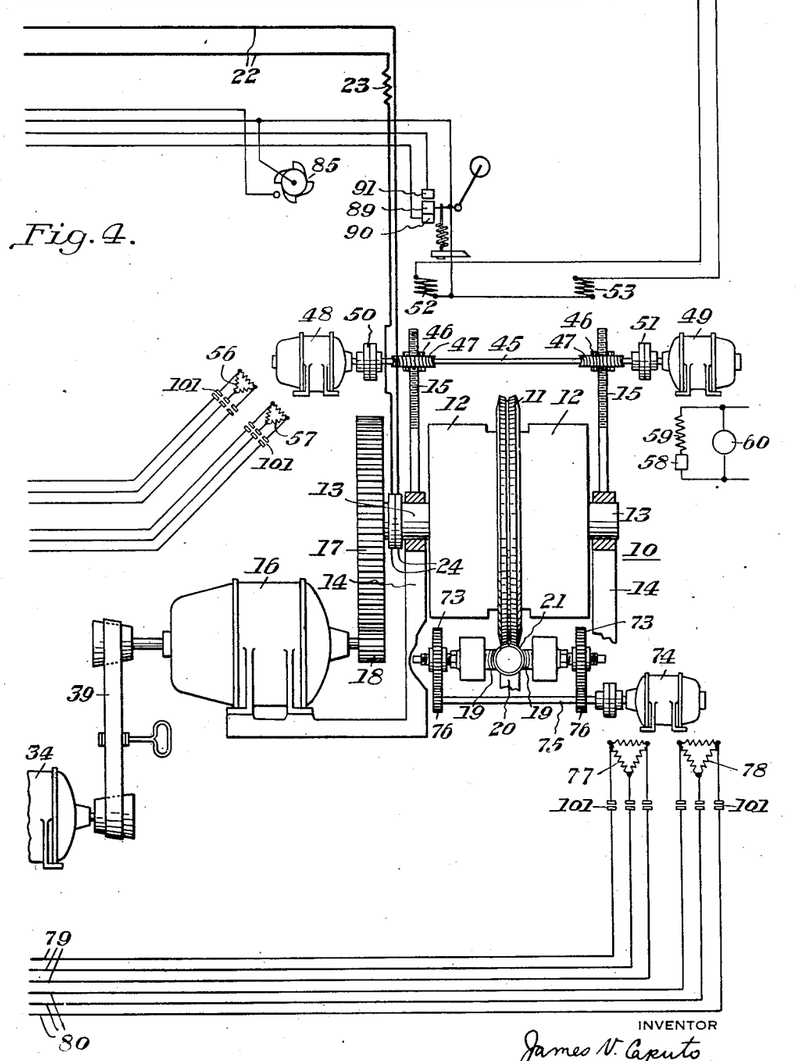
Figure 4 completes the showing of the circuit diagram in full.

The remainder of the control system comprises principally auxiliary devices such as relays, contactors, and the like, which are standard equipment and therefore require no detailed description. The operation of these devices in the desired sequence will therefore be explained in the general description of the operation of the system about to be given. This description may be read either with reference to the complete circuit diagram of Figures 2 through 4, or with reference to the schematic diagram of Figure 1. In the latter, the relay contacts are designated by the number of the relay and a superscript indicating the position of the contact on the relay, counting down from the top, where the contact is shown apart from its relay. Generator fields are indicated in Figure 1 by the number of the generator with an "F" added.

Starting and control circuits for the motor 28 and the motor 16 have not been illustrated since they are already well known and are not part of the present invention. Normally, the system will operate on constant frequency but the speed of the electrode motor will be variable under manual control to provide a high quality of product.

The entire automatic operation of the system is under the control of a starting push button 81. Until this push button is operated, there is no current available at the buses 61 and 62 for operating the automatic devices. When the push button 81 is operated, a relay 82 is connected directly across the armature of the generator 30 and operates to close its front contacts. The upper front contact completes a locking circuit for the relay through a stop push button switch 83 which is normally closed. The lower contact of the relay completes the circuit from the armature of the generator 30 to the control bus 62 through the contacts of power failure relays 84 which are normally closed.

A rotary switch 85 is positioned in the path of the tube entering the welder so that the tube will rotate the switch to effect momentary closure thereof just before the tube enters the welder. As the switch 85 closes, a circuit is completed from the control bus 61 through the welder switch to the winding of a relay 86 which has a dash-pot or other means to delay opening thereof on deenergizing of its winding. The closing of the bottom contact of the relay 86 connects the differential coil 68 of the regulator 61a to the contact 42 of the relay 40 for subsequent control thereby. The closing of the upper contact of the relay 86 completes a circuit from the bus 61 through the welder switch 85, the upper contact of the relay 86 to the winding of a relay 87 and thence to the bus 62. The switch 85 is closed for an instant only, but the advancing tube immediately operates a flag switch 88, contacts 89 and 90 of which are normally in engagement so that the contact 89 engages a contact 91. The flag switch 88 is held in operative position as long as the pipe is traversing the welder. The relay 87 is thus energized during that period.

When the relay 87 is energized, its upper front contact completes a circuit for a contactor 92. This contactor operates the contacts 93 and 94 which connect the field windings of the generator 25 across the variable voltage generator 31 and the field winding of the generator 26 across the field winding of the generator 30. The two top contacts of the relay 87 shunt the field windings of the generators 25 and 26 when the relay is deenergized. The top contact of this relay is designed to open last.

A relay 95 is adapted to be energized continuously. Before the tube enters the welder, this relay is energized by a circuit under the control of the contacts 89 and 90 of the welder switch 88, which are normally closed. When a pipe enters the welder so that these contacts are opened, the relay 95 is under the control of contacts 96, which are closed as long as the relay 40 occupies the neutral position but which are opened when the relay moves in either direction. Both the relays 95 and 87 are slow releasing relays and have dashpots or other means for this purpose. The relay 95 controls the excitation of the generators 25 and 26. The circuit for the contactor 92 includes the top contact of the relay 95 so that if the relay 95 is deenergized, excitation for the generator field windings is cut off. The relay 95 is designed in any convenient manner so the top contact is the last to open. The lower contacts of the relay 95 cooperate with the corresponding contacts of the relay 87 to shunt resistors 97 and 98, which are connected in series with the field winding circuits, when both the relays are energized. When either relay is deenergized, the windings themselves are shunted and the shunts around the resistors 97 and 98 are opened.

As soon as the tube has entered the welder and excitation is supplied to the generators as described in the foregoing, welding current begins to flow through the tube. A relay 99 is connected to a current transformer 99a in the circuit between the winding 37 and the motor 35 and the transformer 38. The relay 99 is therefore energized as soon as a predetermined current flows to the electrode. The operation of the relay 99 closes a circuit for a contactor 100. The contactor 100 closes contacts 101 connecting the windings 56, 57, 77 and 78 of the motors 48 and 74 to the generators 33 and 34, so that the motors operate under the continuous control of the generators as long as there is any difference in the frequency of the latter. If the generators 33 and 34 operate at the same speed, the motors 48 and 74 remain stationary.

While the tube is passing through the welder, the voltage of the exciter 31 is controlled by the regulator 61a and the relay 40. Under normal conditions, the generators 33 and 34 operate at the same speed, the speed of the generator 34 being adjusted by means of the Reeves drive to correspond with that attained by the motor 35 when the generators are supplying normal welding current. The magnetizing coil 67 of the regulator 61a is connected directly across the buses 61 and 62. The differential coil 68 will be connected across the same circuit when the contact 42 of the relay 40 is closed. The contact 42 of the relay 40 will be closed whenever the current supplied to the welder decreases so that the speed of the generator 33 drops. Under these conditions, the energization of the differential coil 68 neutralizes the effect of the magnetizing coil 67 and permits the spring 66 to close the regulator contact 65. The resistor 63 in series with the field of the exciter generator 31 is shunted so that the excitation of the generator is increased. The result, of course, is that the excitation supplied to the generator 25 is increased. As soon as the welding current returns to its normal value, the generator 33 speeds up, the relay 40 opens its contact 42 to deenergize the coil 68 of the regulator 61a and the magnetizing coil then opens the contact 65 to reinsert the resistor 63 in series with the field winding of the exciter generator 31.

The operation of the relay 40, as described above, also opens the contacts 96. The opening of the contacts 96 deenergizes the relay 95 but since the latter is a slow opening relay, it does not at once open its contacts. Its contacts open only after a predetermined time after it has been deenergized and this time may be adjusted so that during ordinary operations the relay will not drop out. The contact 43 of the relay 40 controls signal lamps 101 and 102 to indicate to the operator the conditions under which the welder is operating.

If the relay 40 maintains the contacts 96 open for the predetermined length of time, due to a difference between the speeds of the generators 33 and 34, the relay 95 will finally drop out and deenergize the contactor 92 so that the contacts 93 and 94 will open to disconnect the generator field windings from their source of excitation. The welding current is thereby cut off.

If normal conditions prevail until the pipe is completely welded, the passage of the completed tube from the welder will release the flag switch 88 so that it closes its contacts 89 and 90 and opens the contact 91. This deenergizes the relay 87 but the latter is a slow operating relay so that it does not immediately drop out. The relay 87 is set to drop out just before the trailing end of the tube leaves the electrode. When it finally opens, the shunts are removed from the resistors in series with the fields, the field windings are shunted, and the field contactor 92 is then deenergized to open the field circuits.

As soon as the generator fields are deenergized, current stops flowing in the welding circuit and the generator 33 slows down. This tends to operate the relay 40, but the opening of the welder switch 88 deenergizes the relay 86 and prevents the relay 40 from controlling the regulator 61a.

When welding current ceases, the relay 99 is deenergized and the contactor 100 opens its contacts to disconnect the motors 48 and 74 from the generators 33 and 34.

The relay 95 has its time delay means adjusted so that it will not open between the cessation of the welding current and the closing of the contacts 89 and 90 which maintain energization of the relay winding. The relay 95 is thus energized at all times unless some abnormal condition arises and continues for a definite length of time. In such case, the relay drops open and deenergizes the generator field windings. The object of this operation, as well as that of deenergizing the fields when the tube leaves the welder, of course, is to prevent burning of the electrode.

When there is no tube in the welder, the generator field windings are shunted but current limiting resistors are connected in series therewith. At this time, the field circuits are open. When a tube enters the welder, the field circuits are closed, the shunts are removed from the field windings and the series resistors are shunted. The entire system is then under the control of the relay 40 until the tube has passed entirely through the welder. A reversing switch RS permits reversal of the field 25F.

Figures 5, 6:
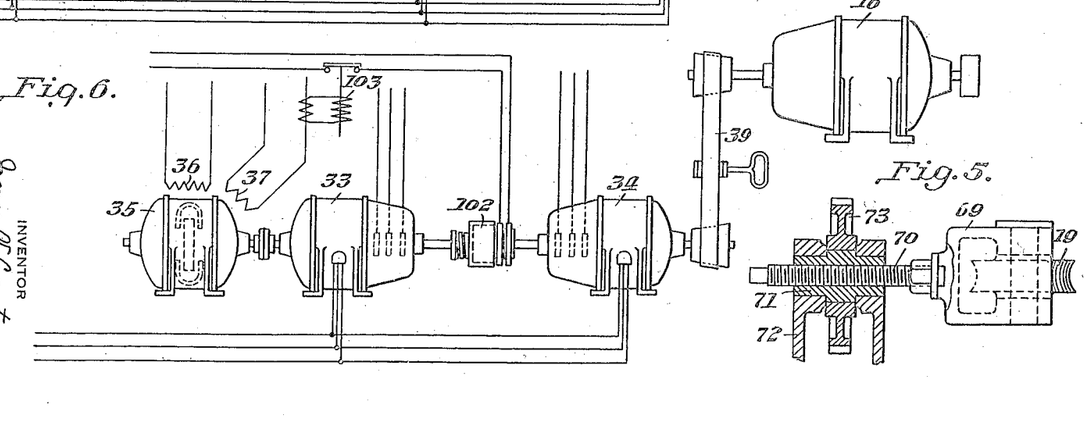
Figure 5 is a sectional view of a detail.
Figure 6 is a partial diagrammatic view illustrating a modification of one element of the invention.

Figure 6 illustrates the means for maintaining continued rotation of the generator 33 even after the cessation of welding current, to avoid operating the relay 40. According to this scheme, the generator 33 is driven from the electrode motor 16 by means of a magnetic clutch 102 which is engaged as soon as the welding current ceases. A relay 103 controls the clutch 102. This arrangement permits the relay 40 to maintain its neutral position even though the welding current has been discontinued. The clutch 102 will be designed so that, when engaged, there will be a predetermined relation between the rotors of the generators 33 and 34 whereby they will operate in phase.

Figure 7:
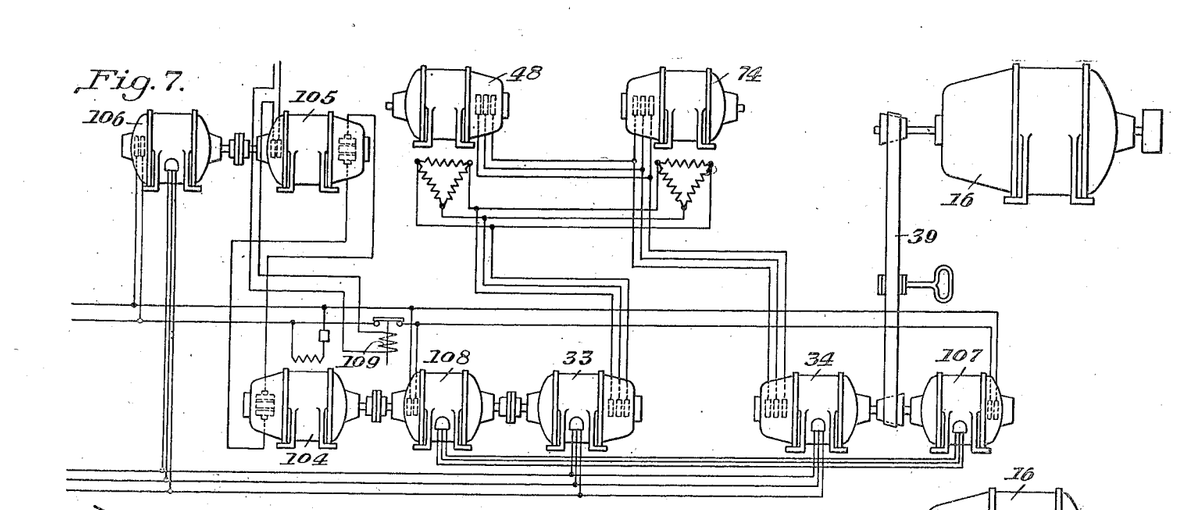
Figure 7 is a partial diagram showing a further modification.

Figure 7 shows another method of accomplishing a similar result except that electrical means are employed instead of mechanical means. This figure also shows further the scheme of connections for operating the motors 48 and 74. In Figure 7, the generator 33 is normally driven by a motor 104. The motor 104 is supplied with current from a frequency converter 105. The field winding of the converter 105 is energized in accordance with the welding current from the transformer 38. The converter 105 is driven by a synchronous motor 106.

A generator 107 is driven by the electrode motor 16. A synchronous motor 108 is adapted to be driven by the generator 107 when a relay 109 is deenergized by cessation of the welding current. In other words, the generator 33 is driven by the motor 104 at a speed proportional to the welding current as long as that current persists. When that current ceases, the synchronous motor 108, driven by the generator 107, drives the generator 33 and the changeover is automatically accomplished by the relay 109. The scheme of stator and rotor connections for the motors 48 and 74 is clearly shown in Figure 7. According to this scheme, the stator windings of both motors are connected to the generator 33 and rotor windings of both motors are connected to the other generator 34.

Figures 8, 9:
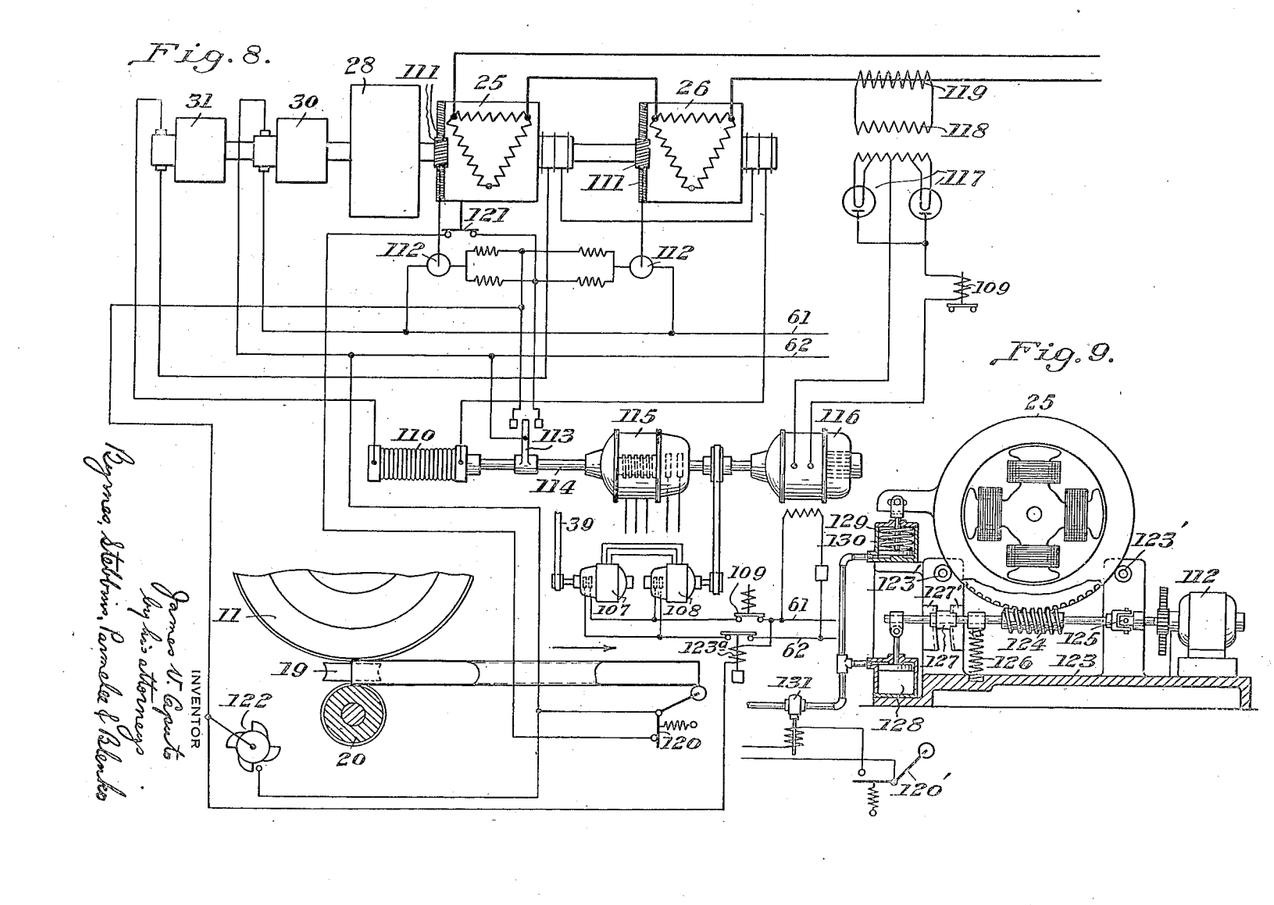
Figure 8 is a schematic diagram of the mechanism employed to vary the phase relation between the voltages of the two welding generators.
Figure 9 is a sectional view through one of the generators showing the stator shifting mechanism.

Instead of varying voltage on the welding circuit by varying the excitation of one of the generators, I may excite both generators similarly to the same extent and vary the voltage by changing the vector relation between the voltages developed by the individual generators. The same method may be used for initiating or discontinuing the welding current. A system of this type is illustrated in Figure 8. According to this system, the field windings of the generators 25 and 26 are connected in series with the generator 31 through a carbon-pile rheostat 110. The stators of the generators 25 and 26 are adapted for rotation under the control of worm drives 111 operated by reversing motors 112. The motors 112 are controlled by a contact 113 on a shaft 114 which also operates the rheostat 110. The shaft 114 is actuated by a special type of synchronous motor 115 having a rotor which rotates on the shaft. A threaded relation between the shaft and the rotor is provided so that as long as the two are driven in synchronism, there is no axial movement of the shaft 114. The shaft of the machine 115 is driven by a motor 116 which is driven at a speed proportional to the current flowing in the welding circuit 22. The stator winding of the machine 115 is energized by the output of the generator 34 driven by the electrode motor, as in Figure 7 and drives the rotor at synchronous speed. The motor 116 is energized by the output of a pair of rectifiers 117. The rectifier output is controlled by the current passing through the circuit 22, by means of transformers 118 and 119.

When the motor 116 accelerates in response to increased welding current so that there is an axial movement of the shaft 114, the contact 113 energizes the forward and reverse field windings of the motors 112 to cause shifting of the stators of the generators 25 and 26 is opposite directions, to increase the phase angle between the voltages thereof so that the resultant voltage will be decreased and the welding current similarly reduced. As the welding current decreases, the reverse operation takes place and an increased voltage is applied to the welding circuit. In either case, the restoration of the desired welding current terminates the adjustment of the generator stators. The carbon-pile rheostat is operated by the shaft 114 in a well known manner to vary the excitation of the generator fields similarly.

In order to reduce the welding voltage before the end of the tube passes out of the welding throat, I provide a flag switch 120 adapted to be closed by the leading end of the tube while the trailing end is still in the welder. The switch 120 completes a circuit for the motors 112 to shift the stators of the generators 25 and 26 so that the welding voltage will be reduced substantially to zero. A normally closed limit switch, indicated diagrammatically at 121, prevents over-travel of the generator stators. As the welding current is reduced to zero by changing the phase relations of the generator voltages, there would be a tendency for the contact 113 to reverse the stator shift. To prevent this, it is necessary to drive the rotor of the motor 116 by the synchronous motor 108, as shown in Figure 7, which operates in synchronism with the generator 107, driven by the electrode motor. The energization of the motor 108 is controlled by the relay 109 as in Figure 7. This prevents the operation of the contact 113 to restore the welding voltage as it ordinarily would do when the welding current decreased.

When the next tube enters the welder, therefore, the generator stators are in a position of minimum voltage. A switch 122, similar to that shown at 85, operates as the next pipe enters the welder to energize momentarily the reverse field windings of the motors 112 to start the generator stators back toward normal position. This initiates the building up of the welding voltage and a relay 123a operates simultaneously to deenergize the field of motor 108 and generator 107 so that subsequent operation of the stator shifting mechanism is under the control of the contact 113 which is responsive, however, to the welding current and electrode speed. The relay 123a is an adjustable, slow operating relay and is energized only for an instant. The initiation of welding current causes the operation of the relay 109 to maintain the field circuits of generator 107 and motor 108 open. As soon as the succeeding tube enters the welder, the shaft of the motor 115 is driven mechanically by the motor 116, instead of electrically from the generator 107 and the motor 108 as in Figure 7. Thus, the stator shifting mechanism is again placed under the control of the electrode speed and the welding current, as before.

Figure 9 illustrates one form which the stator shifting mechanism may take, together with an alternative arrangement for reducing the welding voltage as the tube is about to leave the welder.

Figure 9 shows the generator 25 having its stator rotatably positioned on bearings 123' in a base 123. The motor 112 operates a worm 124 for shifting the stator of the generator 25 by means of worm teeth formed therein. The worm 124 is connected to the motor 112 through a universal joint 125 and a spring 126 normally urges the worm into engagement with the worm teeth. The outer end of the worm shaft is carried in a bearing block 127 slidable in arcuate guides 127' formed in the base. An air cylinder 128 when under pressure, operates to pull the worm shaft out of engagement with the worm teeth so that the generator stator is free for rotation independent thereof. An air cylinder 129 operates to shift the stator practically instantaneously to the position in which the welding voltage is reduced substantially to zero. A spring 130 cushions the movement of the piston in the cylinder 129 and also serves to return the generator to normal position. A flag switch 120', corresponding with that shown at 120, operates to control a valve 131 admitting pressure to the cylinders 128 and 129.

In operation, the apparatus shown in Figure 9 is similar to that of Figure 8. When the flag switch 120' is closed, the valve 131 admits fluid to the cylinders 128 and 129. The piston in the cylinder 128 withdraws the worm shaft 124 from engagement with the worm teeth on the stator of the generator 25. The piston in the cylinder 129 instantaneously shifts the stator of the generator 25 to the position in which the welding voltage is reduced substantially to zero. These conditions are maintained as long as the switch 120' is closed, although a time-delay relay may be inserted between the switch 120' and the valve 131, so that after the trailing end of the pipe has passed out of the welder, pressure in the cylinders 128 and 129 is relieved and conditions restored to normal. If desired, however, the stator of the generator 25 may be held in the position which produces the minimum voltage until the next succeeding tube enters the welder, by the use of suitable control switches.

It will be apparent from the foregoing description that my invention provides a system for the control of generators in a welding system so that the desired results are obtained automatically at all times. Among the objects accomplished and the advantages obtained are the following. The voltage across the electrode is built up as the tube enters the welder and correspondingly reduced to zero as the tube leaves the welder. All arcing is thus avoided. If the welder operates above or below normal speed, or if the welding current is maintained above or below normal value for a predetermined time, the welding current will be shut off. The correlation of welding current and electrode speed maintains a constant welding heat at the edges of the tube seam. Any variation in flow of current or electrode speed is properly compensated for by adjusting the welding current in the proper direction. If the tube diameter varies, the different pressure exerted by the side pressure rolls causes different amounts of current to traverse the seams so that the pressure rolls are correspondingly adjusted to remedy this condition. The contact pressure of the welding electrode is likewise adjusted and wear of the electrode is automatically compensated for by vertical adjustment thereof. The electrical differential relay can be employed as a signal to the operator, as well as an automatic means for correcting undesirable conditions.

Instead of adjusting the voltage of one generator, I can use two constant voltage generators and vary the phase angle therebetween in order to obtain the proper welding voltage. This system is also capable of automatic actuation and has the advantage that the effect of armature reaction is not so pronounced where a good strong field is employed in both generators instead of a full field in one and a weak field in the other.

The control of the welder voltage by varying the phase relations between the voltages of the two welding generators offers many advantages. The system is simple and effective. None of the main circuits need be opened and the control mechanism is relatively inexpensive.

Although I have illustrated and described herein but a few of the possibilities of the invention, it will be apparent that it may be practiced otherwise and by the use of other apparatus. Any such changes, however, which do not depart from the spirit of the invention are intended to be contemplated within the scope of the appended claims.

I claim:

1. An electric energy supply system for welding apparatus including an electrode, comprising transformers having their secondary windings connected to said electrode, a pair of generators connected in series to the primary windings of the transformers, common excitation supplying means for said generators, and means for varying the resultant of the voltages of said generators.

2. In a welding apparatus, an electrode and side pressure rolls, means for adjusting the electrode and side pressure rolls relative to the work, means for automatically actuating said adjusting means in accordance with the speed of the electrode and the welding current, and means actuated by movement of the work for rendering the pressure regulating means ineffective when the work passes out of the welder.

3. In an electric welder, the combination with an electrode, transformers for supplying current thereto, of a generator for supplying current to the transformers, said generator having a movable stator, and means for shifting the stator to vary the voltage applied to the transformers in accordance with the magnitude of the welding current and the speed of the electrode.

4. In a welding system, the combination with a pair of generators having movable stators for jointly supplying welding current to an electrode, of means automatically responsive to the speed of the electrode and the current supplied thereto for shifting the stators of said generators to vary the phase relation of the voltages thereof.

5. In an electric welding system, an electrode, transformers therefor, and a pair of generators connected in series for supplying current to said transformers, said generators having movable stators and means for automatically controlling the excitation of said generators, means for shifting the stators of said generators to vary the resultant voltage applied to the transformers, and means responsive to the electrode speed and the welding current for actuating said excitation controlling and stator shifting means.

6. In a welder, the combination with an electrode, of generators connected in series for supplying current thereto, and means for varying the phase relation between the generators for varying the voltage across said electrode.

7. In a welder, a rotary electrode, a variable voltage generator for supplying current to the electrode, vertical adjusting means for the electrode, pressure rolls and adjusting means therefor, and means responsive jointly to the speed of the electrode and the current supplied thereto for controlling the operation of said adjusting means for the electrode and pressure rolls.

8. In a welder, the combination with a rotary electrode, a variable voltage generator for supplying current thereto, a regulator for controlling the generator voltage, and means for vertically adjusting the electrode, of a relay for rendering said regulator ineffective, and means for actuating said adjusting means and said relay, said last mentioned means being responsive to the speed of said electrode and the current supplied thereto.

9. In a welder, a rotary electrode, a generator supplying current thereto, a regulator for controlling the voltage of the generator and a relay for rendering the regulator effective, pressure rolls and lateral adjusting means therefor, means for adjusting said electrode vertically, motors for operating said adjusting means, and means for controlling said relay and motors including a pair of generators driven respectively at speeds proportional to electrode current and electrode speed, said last-mentioned means also including means responsive to the frequencies of the last mentioned generators.

10. In a welder, an electrode, side pressure rolls, means for adjusting the electrode and means for adjusting the side pressure rolls to and from the work, means responsive to the electrode speed and electrode current for operating said adjusting means, and means responsive to the electrode current for rendering said adjusting means effective when current is being supplied to the electrode.

11. In a welder, a work-engaging roll, means for adjusting the roll relative to the work, manually controlled operating means for the adjusting means, means responsive to the current supplied to the work effective to operate the adjusting means, and releasable connections between said operating means, respectively, and said adjusting means.

12. In a control system for an electric welder including an electrode, a driving motor and a supply generator therefor, side pressure rolls and means for adjusting said rolls laterally and said electrode vertically, a motor energized in accordance with electrode current, generators driven by said motors, and motors controlled jointly by said last mentioned generators for effecting operation of said adjusting means.

13. The combination with a welder electrode, a generator for supplying current thereto, a field winding for said generator, of means actuated by movement of the work relative to the electrode for varying the energization of said winding, and means responsive to the speed of the electrode and the current supplied thereto for further controlling the energization of said winding.

14. In a control system for a welder including an electrode and a generator therefor, a relay responsive to electrode current and electrode speed, and means controlled by said relay and operative only after a predetermined time, for rendering the generator ineffective.

15. In a welder, an electrode adjustable to and from the work, a motor for driving it, a generator for supplying current thereto, and pressure rolls adjustable to and from the work, motors for adjusting said electrode and pressure rolls, and means for varying the excitation of said generator and said adjusting motors comprising a generator driven by said electrode motor, a second generator having means for driving it at a speed proportional to the electrode current, and means for operating said last-mentioned generators synchronously when said electrode current ceases.

16. In a welder having an electrode, a driving motor therefor, a generator for supplying electrode current, pressure rolls, said electrode and rolls being adjustable to and from the work, and means for simultaneously varying the generator excitation and the adjustment of the electrode and pressure rolls comprising a generator driven by said motor, a second generator, a frequency converter and a driving motor for operating said second generator at a speed proportional to electrode current, and a relay and adjusting means for the electrode and pressure rolls responsive to asynchronism of said two last-mentioned generators, and means for operating said generators synchronously on cessation of said electrode current.

17. In an electric welding system, the method of terminating the flow of welding current which includes the step of changing the phase relations of the components of the welding voltage.

18. In a welding system, the method of voltage control which includes the steps of varying the phase relations of the components of the welding voltage slightly to change the voltage during the welding operation, and effecting a greater change in said phase relations just before the work leaves the welder.

19. In a welding system including a pair of generators connected in series and having their rotors fixed in alinement, and means for shifting the stators of said generators to vary the phase relations of the generated voltages.

20. In a welder, the combination with an electrode, generators for supplying current to the electrode, of means for varying the current supplied in accordance with the electrode speed and the magnitude of the current, said means including a direct current motor, and means for energizing said motor with a direct current proportional to the welding current.

21. In a welder, a rotary electrode, means for supplying current to the electrode, pressure rolls, means for adjusting the electrode and rolls to and from the work, and means responsive jointly to the speed of the electrode, and the current supplied thereto for controlling the operation of said adjusting means for the electrode and the pressure rolls.

22. In a welder having an electrode, a current supply system therefor, pressure rolls, the electrode and rolls being adjustable to and from the work, means for simultaneously controlling the current supply, and the electrode and pressure roll adjustment comprising a generator, means for driving it at a speed proportional to that of the electrode, a second generator, and driving means for operating said second generator at a speed proportional to electrode current, adjusting means for the electrode and pressure rolls, and a relay responsive to asynchronism of said two last-mentioned generators for controlling said adjusting means, and means for operating said generators synchronously on cessation of said electrode current.

23. In a welding apparatus, an electrode and side pressure rolls, means for adjusting the electrode and side pressure rolls relative to the work, and means for automatically actuating said adjusting means in accordance with the speed of the electrode and the welding current.

24. An electric welding machine comprising a contact roll and work-engaging rolls cooperating therewith to form a welding throat, means for progressively and longitudinally feeding to said throat the material to be welded, and means responsive to the current traversing said contact roll for automatically adjusting at least one of the rolls to vary the size of the throat and the pressure exerted on the work thereby.

25. In an electric welder, the combination with an electrode, a transformer for supplying current thereto, of a generator for supplying current to the transformer, said generator having a movable stator, and means for shifting the stator to vary the current supplied to the work in accordance with the speed of the work.

26. In a welding machine, a supply system therefor, electrode and pressure rolls embracing the work, means for adjusting said electrode and pressure rolls automatically toward and away from the work while the work is progressively and longitudinally moving through the machine to effect a uniform weld, and means for rendering said adjusting means inoperative when the work leaves the welding machine.

27. In a welder, a rotary electrode, a system for supplying current thereto, a regulator for varying the supply voltage of the system, and means for biasing the regulator comprising a pair of generators driven respectively at speeds proportional to the electrode current and speed, and a relay responsive to asynchronism of said generators.

28. In a pipe welding machine, an adjustable electrode and adjustable side pressure rolls embracing the tube to be welded, and means for adjusting said electrode and side pressure rolls, comprising a pair of generators driven at speeds proportional to the electrode current and speed, and a relay responsive to asynchronism of said generators.

29. The combination with a welder electrode, a generator for supplying current thereto, and a field winding for said generator, of means actuated by movement of the work relative to the electrode for establishing or terminating current in said field winding, and means responsive to the speed of the work for further controlling the current in said winding.

30. In an electric welder, the combination with an electrode, of a plurality of sources connected in series for jointly supplying current thereto including a generator having a movable yoke, and means for shifting the yoke to vary the vector relation of the voltages of said sources in accordance with the magnitude of the welding current and the speed of the electrode.

31. In an electric welder, the combination with an electrode, of a plurality of sources connected in series for jointly supplying current thereto including a generator having a movable yoke, and means for shifting the yoke to vary the vector relation of the voltages of said sources in accordance with the magnitude of the welding current.

32. In an electric welder, the combination with an electrode, of a plurality of sources connected in series for jointly supplying current thereto including a generator having a movable yoke, and means for shifting the yoke to vary the vector relation of the voltages of said sources in accordance with the speed of the electrode.

33. In a welding system, the combination with an electrode and a plurality of generators connected in series for supplying welding current to the electrode, of means for shifting the relative phase relation of the voltage of said generators to vary the voltage across the electrode.

34. In an electric supply system, an alternating-current supply source, a direct-current motor, means for generating and supplying to said motor continuously a direct current proportional at all times to the alternating current delivered by said source, and means actuated by said motor for controlling the voltage of said source.

35. The combination with a welding electrode, a generator for supplying current thereto, a regulator for the generator, and a relay controlling the regulator, of a circuit closed by movement of the work toward the welder, and means controlled by said circuit for rendering said relay effective to control said regulator.

36. In a welding apparatus, an electrode for supplying current to moving, opposed seam edges, and pressure rolls for forcing said edges together, and means for adjusting said pressure rolls to and from the work, means responsive to the speed of movement of said edges, and means actuated thereby for operating said adjusting means.

37. In a welding apparatus, an electrode for supplying current to moving, opposed seam edges, and pressure rolls for forcing said edges together, and means for adjusting said pressure rolls to and from the work, means responsive to the magnitude of the current traversing the electrode, and means actuated thereby for operating said adjusting means.

38. In a welding apparatus, an electrode for supplying current to moving, opposed seam edges, and pressure rolls for forcing said edges together, and means for adjusting said pressure rolls to and from the work, means responsive to the speed of movement of said edges, means responsive to the magnitude of the current supplied by said electrode, and means controlled jointly by said two last-mentioned means for operating said adjusting means.

39. In a welding apparatus, an electrode and side pressure rolls, means for adjusting the electrode and side pressure rolls relative to the work, means for automatically actuating said adjusting means responsive to the welding current and means actuated by movement of the work for rendering the pressure regulating means ineffective when the work passes out of the welder.

40. In an electric welding system, an electrode, transformers therefor, and a pair of generators connected in series for supplying current to said transformers, said generators having movable stators and means for automatically controlling the excitation of said generators, means for shifting the stators of said generators for varying the said voltage applied to the transformers, and means responsive to the welding current for actuating said excitation controlling and stator shifting means.

41. The combination with a welder electrode, a generator for supplying current thereto, a field winding for said generator and means actuated by movement of the work relative to the electrode for varying the energization of said winding and means responsive to the electrode current supplied thereto for further controlling the energization of said winding.

42. In a welder, the combination with an electrode, a generator for supplying current to the electrode, of means responsive to the magnitude of the current for controlling the generator, said means including a direct current motor and means for energizing said motor with a direct current proportional to the welding current.

43. In a welder, the combination with a rotary electrode, a variable voltage generator for supplying current thereto, a regulator for controlling the generator voltage, means for vertically adjusting the electrode, of a relay for rendering said regulator ineffective, means for actuating said adjusting means and said relay, said actuating means being responsive to the electrode current supplied thereto.

44. In a welder, a rotary electrode, a generator for supplying current thereto, a regulator for controlling the voltage of the generator, and a relay for rendering the regulator effective, pressure rolls and lateral adjusting means therefor, means for adjusting said electrode vertically, motors for operating said adjusting means, and means for controlling said relay and motors including a generator driven at a speed proportional to the electrode current.

45. In a welder, an electrode, side pressure rolls, means for adjusting the electrode and means for adjusting the side pressure rolls to and from the work, means responsive to the electrode current for operating said adjusting means, and means responsive to the electrode current for rendering said adjusting means effective when current is being supplied to the electrode.

46. In a welder, a rotary electrode, a system for supplying current thereto, a regulator for varying the supply voltage of the system, and means for biasing the regulator comprising a generator driven at a speed proportional to the electrode current and a relay responsive to the frequency of said generator.

47. In a welding apparatus, an electrode and side pressure rolls, means for adjusting the electrode and the side pressure rolls relative to the work, means for automatically actuating said adjusting means, said actuating means being responsive to the speed of the work, and means actuated by movement of the work for rendering the pressure regulating means ineffective when the work passes out of the welder.

48. In an electric welding system, an electrode, transformers therefor, and a pair of generators connected in series for supplying current to said transformers, said generators having movable stators and means for automatically controlling the excitation of said generators, means for shifting the stators of said generators for varying the said voltage applied to the transformers, and means responsive to the electrode speed for actuating said excitation controlling and stator shifting means.

49. The combination with a welder electrode, a generator for supplying current thereto, a field winding for said generator, means actuated by movement of the work relative to the electrode for varying the energization of said winding, and means responsive to the electrode speed for further controlling the energization of said winding.

50. In a control system for a welder including an electrode and a generator therefor, a relay responsive to the electrode speed, and means controlled by said relay and operative only after a predetermined time, for rendering the generator ineffective.

51. In a welder, the combination with an electrode, a generator for supplying current to the electrode, of means responsive to the electrode speed for controlling said current, said means including a synchronous motor and means for energizing said motor with a frequency proportional to the electrode speed.

52. In a welder, the combination with a rotary electrode, a variable voltage generator for supplying current thereto, a regulator for controlling the generator voltage, means for vertically adjusting the electrode, of a relay for rendering said regulator ineffective, means for actuating said adjusting means and said relay, said actuating means being responsive to the electrode speed.

53. In a welder, a rotary electrode, a generator for supplying current thereto, a regulator for controlling the voltage of the generator, and a relay for rendering the regulator effective, pressure rolls and lateral adjusting means therefor, means for adjusting said electrode vertically, motors for operating said adjusting means, and means for controlling said relay and motors including a generator driven at a speed proportional to the electrode speed.

54. In a welder, an electrode, side pressure rolls, means for adjusting the side pressure rolls to and from the work, means responsive to the electrode speed for operating said adjusting means, and means responsive to the electrode current for rendering said adjusting means effective when current is being supplied to the electrode.

55. In a welder, a rotary electrode, means for supplying current to the electrode, pressure rolls, means for adjusting the electrode and rolls to and from the work, and means responsive to the electrode speed for controlling the operation of said adjusting means for the electrode and the pressure rolls.

56. In a welder, a rotary electrode, a system for supplying current thereto, a regulator for varying the supply of voltage to the system, and means for biasing the regulator comprising a generator driven at a speed proportional to the electrode speed and a relay responsive to the frequency of said generator.

57. In an electric welding system, the method of initiating the flow of welding current which includes the step of changing the phase relations of the components of the welding voltage.

58. An electric welding machine comprising a contact roll and work-engaging rolls cooperating therewith to form a welding throat, means for feeding to said throat the material to be welded, and means responsive to the resistance of the welding circuit including said contact roll and the work, for automatically adjusting at least one of said rolls to vary the pressure on the work.

59. An electric welding machine comprising a contact roll and work-engaging rolls cooperating therewith to form a welding throat, means for feeding to said throat the material to be welded, and means responsive to the pressure exerted or the work by said throat for adjusting at least one of said rolls to vary the size of the throat so as to maintain a constant pressure on the work.

JAMES V. CAPUTO.